US012731594B2

(12) United States Patent
Beack et al.

(10) Patent No.: US 12,731,594 B2
(45) Date of Patent: *Sep. 8, 2026

(54) LPC RESIDUAL SIGNAL ENCODING/DECODING APPARATUS OF MODIFIED DISCRETE COSINE TRANSFORM (MDCT)-BASED UNIFIED VOICE/AUDIO ENCODING DEVICE

(71) Applicant: ELECTRONICS AND TELECOMMUNICATIONS RESEARCH INSTITUTE, Daejeon (KR)

(72) Inventors: Seung Kwon Beack, Daejeon (KR); Tae Jin Lee, Daejon (KR); Min Je Kim, Daegu (KR); Kyeongok Kang, Daejeon (KR); Dae Young Jang, Daejeon (KR); Jin Woo Hong, Daejeon-si (KR); Jeongil Seo, Daejeon (KR); Chieteuk Ahn, Seoul (KR); Hochong Park, Seoul (KR); Young-Cheol Park, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 266 days.

This patent is subject to a terminal disclaimer.

(21) Appl. No.: 18/529,830

(22) Filed: Dec. 5, 2023

(65) Prior Publication Data

US 2024/0105194 A1 Mar. 28, 2024

Related U.S. Application Data

(63) Continuation of application No. 17/895,233, filed on Aug. 25, 2022, now Pat. No. 11,887,612, which is a (Continued)

(30) Foreign Application Priority Data

Oct. 13, 2008 (KR) ........................ 10-2008-0100170
Dec. 15, 2008 (KR) ........................ 10-2008-0126994
Oct. 12, 2009 (KR) ........................ 10-2009-0096888

(51) Int. Cl.
*G10L 19/087* (2013.01)
*G10L 19/125* (2013.01)
(Continued)

(52) U.S. Cl.
CPC .......... *G10L 19/087* (2013.01); *G10L 19/125* (2013.01); *G10L 19/22* (2013.01); *G10L 19/26* (2013.01)

(58) Field of Classification Search
CPC ..... G10L 19/087; G10L 19/125; G10L 19/22; G10L 19/26
See application file for complete search history.

(56) References Cited

U.S. PATENT DOCUMENTS 5,732,386 A 3/1998 Park et al.
5,819,212 A 10/1998 Matsumoto et al.
(Continued)

FOREIGN PATENT DOCUMENTS

KR 20070017379 A 2/2007
KR 101797228 B1 11/2017
(Continued)

OTHER PUBLICATIONS

3GPP, TS26.290 AMR-WB+ codec transcoding function V7.0, Technical Specification, 86 pages (Mar. 2007).
(Continued)

*Primary Examiner* — Brian L Albertalli
(74) *Attorney, Agent, or Firm* — Rabin & Berdo, P.C.

(57) ABSTRACT

Disclosed is an LPC residual signal encoding/decoding apparatus of an MDCT based unified voice and audio
(Continued)

encoding device. The LPC residual signal encoding apparatus analyzes a property of an input signal, selects an encoding method of an LPC filtered signal, and encode the LPC residual signal based on one of a real filterbank, a complex filterbank, and an algebraic code excited linear prediction (ACELP).

15 Claims, 9 Drawing Sheets

Related U.S. Application Data continuation of application No. 16/846,272, filed on Apr. 10, 2020, now Pat. No. 11,430,457, which is a continuation of application No. 15/669,262, filed on Aug. 4, 2017, now Pat. No. 10,621,998, which is a continuation of application No. 15/194,174, filed on Jun. 27, 2016, now Pat. No. 9,728,198, which is a continuation of application No. 14/541,904, filed on Nov. 14, 2014, now Pat. No. 9,378,749, which is a continuation of application No. 13/124,043, filed as application No. PCT/KR2009/005881 on Oct. 13, 2009, now Pat. No. 8,898,059.

(51) Int. Cl.
*G10L 19/22* (2013.01)
*G10L 19/26* (2013.01)

(56) References Cited

U.S. PATENT DOCUMENTS

| | | | |
|---|---|---|---|
| 6,134,518 | A | 10/2000 | Cohen et al. |
| 6,658,383 | B2 | 12/2003 | Koishida et al. |
| 7,876,966 | B2 | 1/2011 | Ojanpera |
| 8,321,210 | B2 | 11/2012 | Grill et al. |
| 8,392,179 | B2 | 3/2013 | Yu et al. |
| 8,898,059 | B2 | 11/2014 | Beack et al. |
| 9,378,749 | B2 | 6/2016 | Beack et al. |
| 2003/0004711 | A1 | 1/2003 | Koishida et al. |
| 2006/0173675 | A1 | 8/2006 | Ojanpera |
| 2007/0033023 | A1 | 2/2007 | Sung et al. |
| 2009/0234644 | A1 | 9/2009 | Reznik et al. |
| 2009/0240491 | A1 | 9/2009 | Reznik |
| 2009/0299757 | A1 | 12/2009 | Guo et al. |
| 2010/0138218 | A1 | 6/2010 | Geiger |
| 2011/0153333 | A1 | 6/2011 | Bessette |
| 2011/0173008 | A1 | 7/2011 | Lecomte et al. |
| 2011/0173009 | A1 | 7/2011 | Fuchs et al. |
| 2011/0173010 | A1 | 7/2011 | Lecomte et al. |
| 2011/0202354 | A1 | 8/2011 | Grill et al. |

FOREIGN PATENT DOCUMENTS

| | | | |
|---|---|---|---|
| KR | 101925611 | B1 | 12/2018 |
| KR | 102002162 | B1 | 7/2019 |
| KR | 102322867 | B1 | 11/2021 |
| KR | 1020210134564 | A | 11/2021 |
| WO | 2008071353 | A2 | 6/2008 |

OTHER PUBLICATIONS

ETSI TS 126 290 V7.0.0, "Digital cellular telecommunications system (Phase 2+); Universal Mobile Telecommunications System (UMTS); Audio codec processing functions; Extended Apaptive Multi-Rate—Wideband (AMR-WR+) codec; Transcoding functions (3GPP TS 26.290 version 7.0.0 Release 7)," GSM: Global System for Mobile Communications, 87 pages (2007).

International Organisation for Standardisation, ISO/IEC/JTC 1/SC 29/WG 11, Coding of Moving Pictures and Audio, ISO/IEC JTC 1/SC 29/WG 11N9965, MPEG Press Release, Jul. 25, 2008.

ITU-T, "Wideband coding of speech at around 16 kbit/s using Adaptive Multi-Rate Wideband (AMR-WB)," ITU-T Recommendation G.722.2, 72 pages (2003).

Lecomte, Jeremie et al., "Efficient cross-fade windows for transitions between LPC-based and non-LPC based audio coding," Audio Engineering Society, Convention Paper 7712, 9 pages (2009).

MPEG, "Highlights of the 85th Meeting," MPEG Multiples Views of Video, available online at: http://www.chiariglione.org/mpeg, 4 pages (2008).

Painter, Ted, and Andreas Spanias. "Perceptual coding of digital audio." Proceedings of the IEEE 88.4 (2000): 451-515. (Year: 2000).

Ramprashad, Sean A., "The Multimode Transform Predictive Coding Paradigm," IEEE Transactions of Speech and Audio Processing, vol. 11(2):117-129 (2003).

Max Neuendorf et al.,"Detailed Technical Description of Reference Model 0 of the CfP on Unified Speech and Audio Coding (USAC)", Fraunhofer IIS, VoiceAge Corp. ISO/IEC JTC1/SC29/WG11, MPEG2008/M15867, Busan, South Korea, Oct. 2008.

ISO/IEC FDIS 23003-3:2011(E), "Information technology—MPEG audio technologies—Part 3: Unified speech and audio coding", International Organization for Standardization (ISO) and International Electrotechnical Commission (IEC), ISO/IEC JTC 1/SC 29/WG 11, Sep. 20, 2011.

LPC RESIDUAL SIGNAL ENCODING/DECODING APPARATUS OF MODIFIED DISCRETE COSINE TRANSFORM (MDCT)-BASED UNIFIED VOICE/AUDIO ENCODING DEVICE

CROSS-REFERENCE TO RELATED APPLICATION

This is a continuation of U.S. application Ser. No. 17/895,233 filed on Aug. 25, 2022, which is a continuation of U.S. application Ser. No. 16/846,272 filed on Apr. 10, 2020 (now U.S. Pat. No. 11,430,457, issued on Aug. 30, 2022), which is a continuation of U.S. application Ser. No. 15/669,262 filed on Aug. 4, 2017 (now U.S. Pat. No. 10,621,998, issued on Apr. 14, 2020), which is a continuation of U.S. application Ser. No. 15/194,174 filed on Jun. 27, 2016 (now U.S. Pat. No. 9,728,198, issued on Aug. 8, 2017), which is a continuation of U.S. application Ser. No. 14/541,904, filed on Nov. 14, 2014 (now U.S. Pat. No. 9,378,749, issued on Jun. 28, 2016), which is a continuation of U.S. application Ser. No. 13/124,043, filed on Jul. 5, 2011, (now U.S. Pat. No. 8,898,059, issued on Nov. 25, 2014), which is a National Stage of PCT/KR2009/005881 filed on Oct. 13, 2009. Furthermore, this application claims priority under 35 USC 119 from Korean Patent Application No. 10-2008-0100170 filed on Oct. 13, 2008, Korean Patent Application No. 10-2008-0126994 filed on Dec. 15, 2008, and Korean Patent Application No. 10-2009-0096888 filed on Oct. 12, 2009. The disclosures of these prior U.S. and foreign applications are incorporated herein by reference.

TECHNICAL FIELD

The present invention relates to a line predicative coder (LPC) residual signal encoding/decoding apparatus of a modified discrete cosine transform (MDCT) based unified voice and audio encoding device, and relates to a configuration for processing an LPC residual signal in a unified configuration unifying an MDCT based audio coder and an LPC based audio coder.

BACKGROUND ART

An efficiency and a sound quality of an audio signal may be maximized by using different encoding methods depending on a property of an input signal. As an example, when a CELP based voice and audio encoding device is applied to a signal, such as a voice, a high encoding efficiency may be provided, and when a transform based audio coder is applied to an audio signal, such as a music, a high sound quality and a high compression efficiency may be provided.

Accordingly, a signal that is similar to a voice may be encoded by using a voice encoding device and a signal that has a property of music may be encoded by using an audio encoding device. A unified encoding device may include an input signal property analyzing device to analyze a property of an input signal and may select and switch an encoding device based on the analyzed property of the signal.

Here, to improve an encoding efficiency of the unified voice and audio encoding device, there is need of a technology that is capable of encoding in a real domain and also in a complex domain.

DISCLOSURE OF INVENTION

Technical Goals

An aspect of the present invention provides a block, expressing a residual signal as a complex signal and performing encoding/decoding, that is embodied to encode/decode the LPC residual signal, thereby providing an LPC residual signal encoding/decoding apparatus that improves encoding performance.

Another aspect of the present invention also provides a block, expressing a residual signal as a complex signal and performing encoding/decoding, that is embodied to encode/decode the LPC residual signal, thereby providing an LPC residual signal encoding/decoding apparatus that does not generate an aliasing on a time axis.

Technical Solutions

According to an aspect of an exemplary embodiment, there is provided a linear predicative coder (LPC) residual signal encoding apparatus of a modified discrete cosine transform (MDCT) based unified voice and audio encoding device, including a signal analyzing unit to analyze a property of an input signal and to select an encoding method for an LPC filtered signal, a first encoding unit to encode the LPC residual signal based on a real filterbank according to the selection of the signal analyzing unit, a second encoding unit to encode the LPC residual signal based on a complex filterbank according to the selection of the signal analyzing unit, and a third encoding unit to encode the LPC residual signal based on an algebraic code excited linear prediction (ACELP) according to the selection of the signal analyzing unit.

The first encoding unit performs an MDCT based filterbank with respect to the LPC residual signal, to encode the LPC residual signal.

The second encoding unit performs a discrete Fourier transform (DFT) based filterbank with respect to the LPC residual signal, to encode the LPC residual signal.

The second encoding unit performs a modified discrete sine transform (MDST) based filterbank with respect to the LPC residual signal, to encode the LPC residual signal.

According to another aspect of an exemplary embodiment, there is provided an LPC residual signal encoding apparatus of an MDCT based unified voice and audio encoding device, including a signal analyzing unit to analyze a property of an input signal and to select an encoding method of an LPC filtered signal, a first encoding unit to perform at least one of a real filterbank based encoding and a complex filterbank based encoding, when the input signal is an audio signal, and a second encoding unit to encode the LPC residual signal based on an ACELP, when the input signal is a voice signal.

The first encoding unit includes an MDCT encoding unit to perform an MDCT based encoding, an MDST encoding unit to perform an MDST based encoding, and an outputting unit to output at least one of an MDCT coefficient and an MDST coefficient according to the property of the input signal.

According to still another aspect of an exemplary embodiment, there is provided an LPC residual signal decoding apparatus of an MDCT based unified voice and audio decoding device, including a decoding unit to decode an LPC residual signal encoded from a frequency domain, an audio decoding unit to decode an LPC residual signal encoded from a time domain, and a distortion controlling unit to compensate for a distortion between an output signal of the audio decoding unit and an output signal of the voice decoding unit.

The audio decoding apparatus includes a first decoding unit to decode an LPC residual signal encoded based on a real filterbank, and a second decoding unit to decode an LPC residual signal encoded based on a complex filterbank.

Effect

According to an example embodiment of the present invention, there is provided a block, expressing a residual signal as a complex signal and performing encoding/decoding, that is embodied to encode/decode the LPC residual signal, thereby providing an LPC residual signal encoding/decoding apparatus that improves encoding performance.

According to an example embodiment of the present invention, there is provided a block, expressing a residual signal as a complex signal and performing encoding/decoding, that is embodied to encode/decode the LPC residual signal, thereby providing an LPC residual signal encoding/decoding apparatus that does not generate an aliasing on a time axis.

BEST MODE FOR CARRYING OUT THE INVENTION

Figure 1:
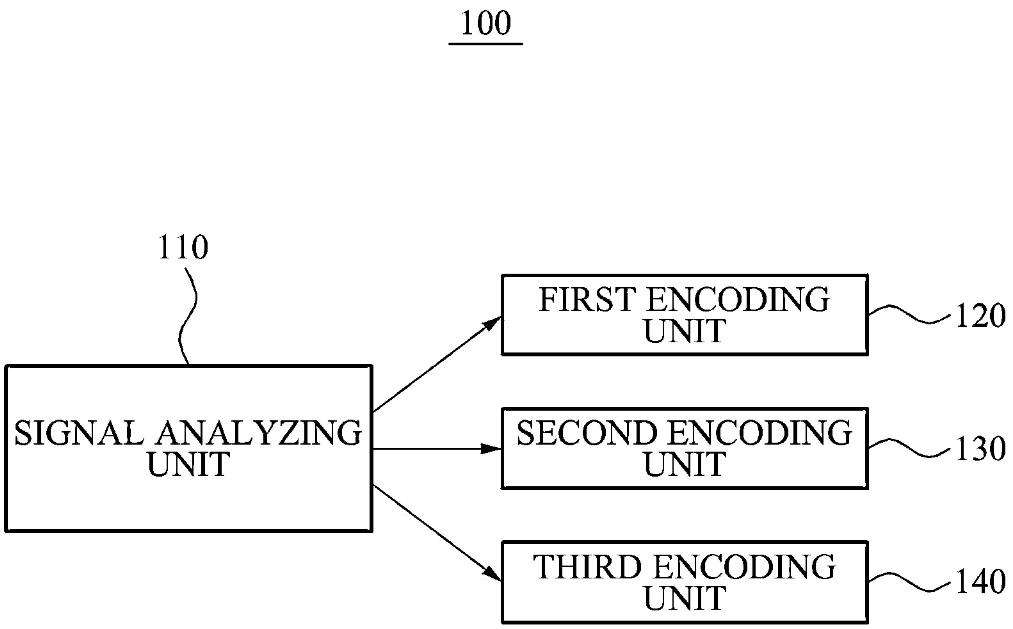
FIG. 1 illustrates a linear predictive coder (LPC) residual signal encoding apparatus according to an example embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates a linear predictive coder (LPC) residual signal encoding apparatus according to an example embodiment of the present invention.

Referring to FIG. 1, the LPC residual signal encoding apparatus 100 may include a signal analyzing unit 110, a first encoding unit 120, a second encoding unit 130, and a third encoding unit 140.

The signal analyzing unit 110 may analyze a property of an input signal and may select an encoding method for an LPC filtered signal. As an example, when the input signal is an audio signal, the input signal is encoded by the first encoding unit 120 or the second encoding unit 130, and when the input signal is a voice signal, the input signal is encoded by the third encoding unit 120. In this instance, the signal analyzing unit 110 may transfer a control command to select the encoding method, and may control one of the first encoding unit 120, the second encoding unit 130, and the third encoding unit 140 to perform encoding. Accordingly, one of a real filterbank based residual signal encoding, a complex filterbanks based residual signal encoding, and an algebraic code excited linear prediction (ACELP) based residual signal encoding may be performed.

The first encoding unit 120 may encode the LPC residual signal based on the real filterbank according to the selection of the signal analyzing unit. As an example, the first encoding unit 120 may perform a modified discrete cosine transform (MDCT) based filterbank with respect to the LPC residual signal and may encode the LPC residual signal.

The second encoding unit 130 may encode the LPC residual signal based on the complex filterbanks according to the selection of the signal analyzing unit As an example, the second encoding unit 130 may perform a discrete Fourier transform (DFT) based filter bank with respect to the LPC residual signal, and may encode the LPC residual signal. Also, the second encoding unit 130 may perform a modified discrete sine transform (MDST) based filterbank with respect to the LPC residual signal, and may encode the LPC residual signal.

The third encoding unit 140 may encode the LPC residual signal based on the ACELP according to the selection of the signal analyzing unit. That is, when the input signal is a voice signal, the third encoding unit 140 may encode LPC residual signal based on the ACELP.

Figure 2:
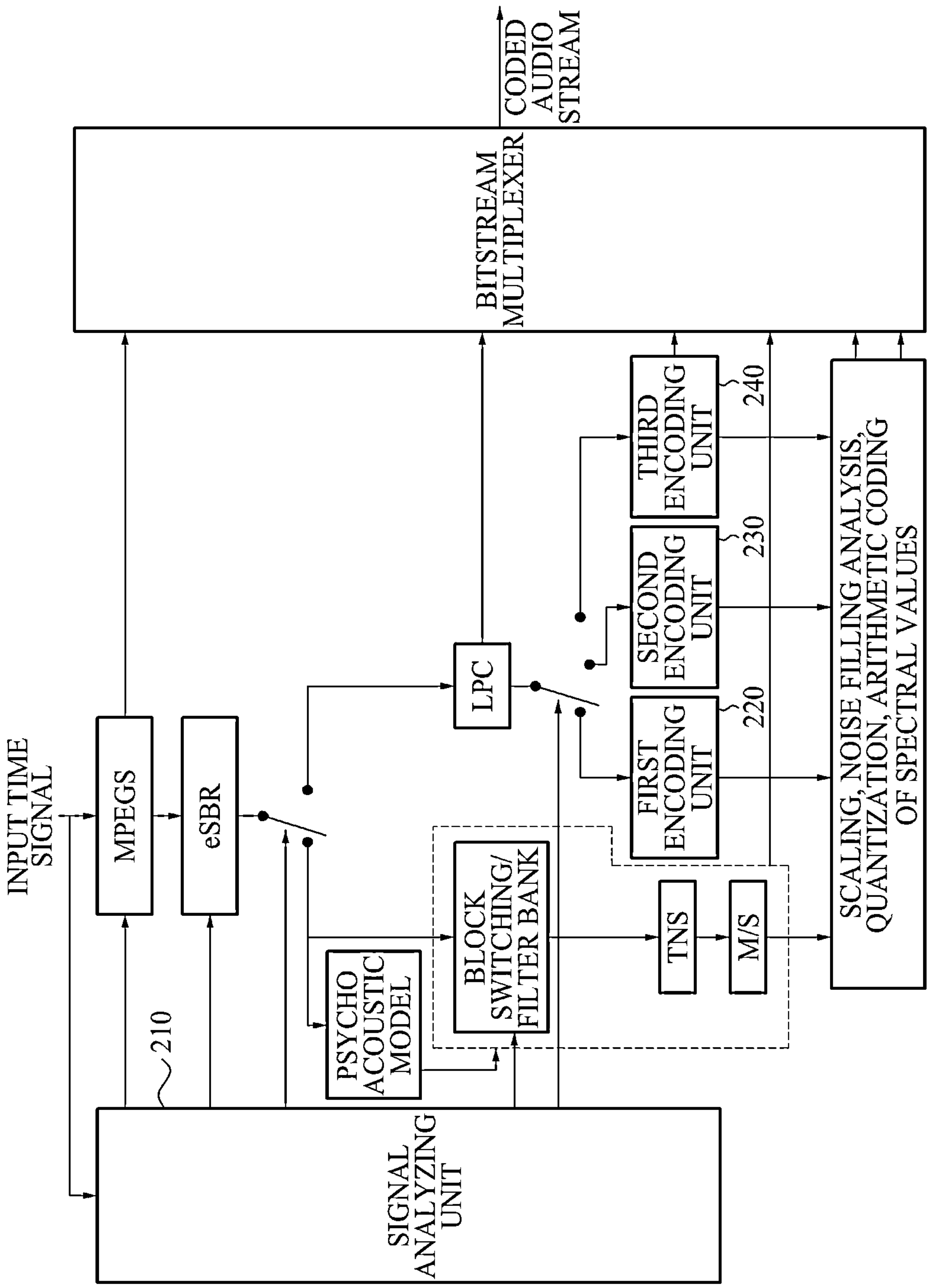
FIG. 2 illustrates an LPC residual signal encoding apparatus in a modified discrete cosine transform (MDCT) based unified voice and audio encoding device according to an example embodiment of the present invention.

FIG. 2 illustrates an LPC residual signal encoding apparatus in a modified discrete cosine transform (MDCT) based unified voice and audio encoding device according to an example embodiment of the present invention Referring to FIG. 2, first, the input signal is inputted into a signal analyzing unit 210 and an MPEGS. In this instance, the signal analyzing unit 210 may recognize a property of the input signal, and may output a control parameter to control an operation of each block. Also, the MPEGS, which is a tool to perform a parametric stereo coding, may perform an operation performed in a one to two (OTT-1) of an MPEG surround standard. That is, the MPEGS operates when the input signal is a stereo, and outputs a mono signal. Also, an SBR extends a frequency band during a decoding process, and parameterizes a high frequency band. Accordingly, the SBR outputs a core-band mono signal (generally, a mono signal less than 6 kHz) from which a high frequency band is cut off. The outputted signal is determined to be encoded based on one of an LPC based encoding or a psychoacoustic mode based encoding according to a status of the input signal. In this instance, a psychoacoustic model coding scheme is similar to an AAC coding scheme. Also, an LPC based coding scheme may perform coding with respect to the residual signal that is LPC filtered, based on one of following three methods. That is, after LPC filtering is performed the residual signal may be encoded based on the ACELP or may be encoded by passing through a filterbank and being expressed as a residual signal of a frequency domain. In this instance, as the method of encoding by passing through the filterbank and being expressed the residual signal of a frequency domain, an encoding may be performed based on a real filterbank or an encoding may be performed by performing a complex based filterbank.

That is, when the signal analyzing unit 210 analyzes the input signal, and generates a control command to control a switch, one of a first encoding unit 220, a second encoding unit 230, and a third encoding unit 240 may perform encoding according to the controlling of the switch. Here, the first encoding unit 220 encodes the LPC residual signal based on the real filterbank, the second encoding unit 230 encodes the LPC residual signal based on the complex filterbank, and the third encoding unit 240 encodes the LPC residual signal based on the ACELP.

Here, when the complex filterbank is performed with respect to the same size of frame, twice the amount of data is outputted than when the real based (e.g. MDCT based) filterbank is performed, due to an imaginary part. That is, when the complex filterbank is applied to the same input, twice the amount of data needs to be encoded. However, in a case of an MDCT based residual signal, an aliasing occurs on a time axis. Conversely, in a case of a complex transform, such as a DTF and the like, an aliasing does not occur on the time axis.

Figure 3:
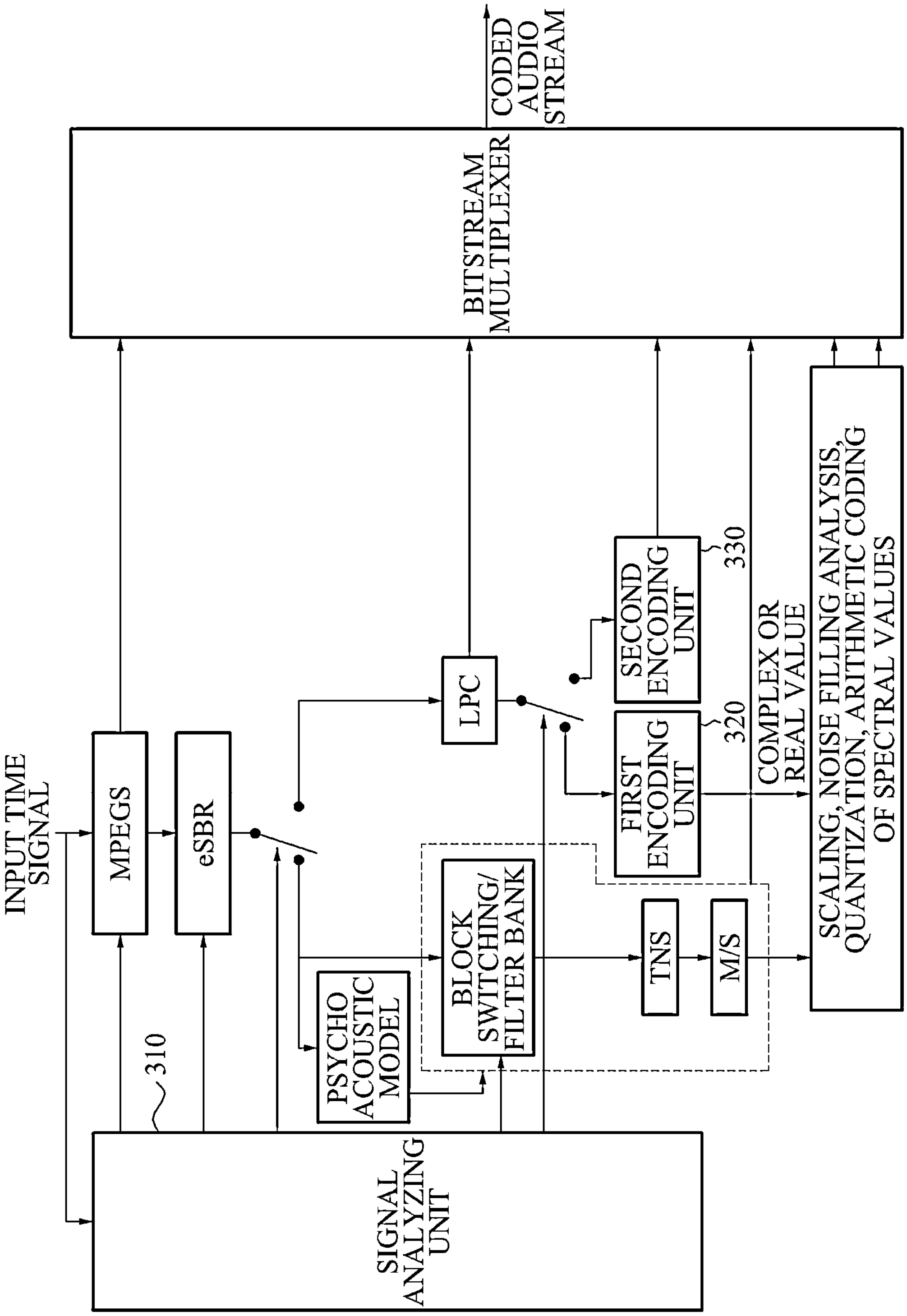
FIG. 3 illustrates an LPC residual signal encoding apparatus in an MDCT based unified voice and audio encoding device according to another example embodiment of the present invention.

FIG. 3 illustrates an LPC residual signal encoding apparatus in an MDCT based unified voice and audio encoding device according to another example embodiment of the present invention.

Referring to FIG. 3, the LPC residual signal encoding apparatus performs the same function as the LPC residual signal encoding apparatus of FIG. 2, and a first encoding unit 320 or a second encoding unit 330 performs encoding according to a property of an input signal.

That is, when a signal analyzing unit 310 may generate a control signal based on the property of the input signal and transfer a command to select an encoding method, one of the first encoding unit 320 and the second encoding unit 330 may perform encoding. In this instance, when the input signal is an audio signal, the first encoding unit 320 performs encoding, and when the input signal is a voice signal, the second encoding unit 330 performs encoding.

Here, the first encoding unit 320 may perform one of a real filterbank based encoding or a complex filterbank based encoding, and may include an MDCT encoding unit (not illustrated) to perform an MDCT based encoding, an MDST encoding unit (not illustrated) to perform an MDST based encoding, and an outputting unit (not illustrated) to output at least one of an MDCT coefficient and an MDST coefficient according to the property of the input signal.

Accordingly, the first encoding unit 320 performs the MDCT based encoding and the MDST based encoding as a complex transform, and determines whether to output only the MDCT coefficient or to output both the MDCT coefficient and the MDST coefficient based on a status of the control signal of the signal analyzing unit 310.

Figure 4:
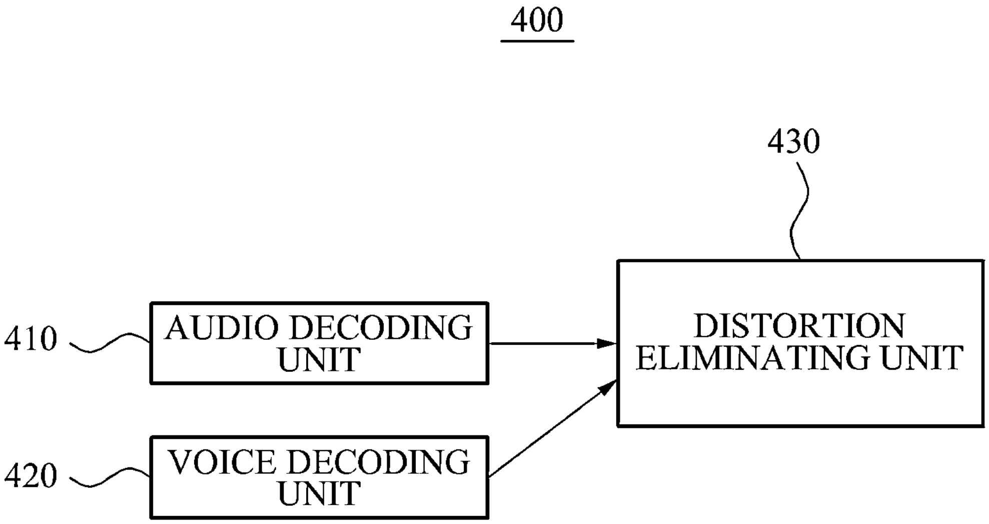
FIG. 4 illustrates an LPC residual signal decoding apparatus according to an example embodiment of the present invention.

FIG. 4 illustrates an LPC residual signal decoding apparatus according to an example embodiment of the present invention.

Referring to FIG. 4, the LPC residual decoding apparatus 400 may include an audio decoding unit 410, a voice decoding unit 420, and a distortion controller 430. The audio decoding unit 410 may decode an LPC residual signal that is encoded from a frequency domain. That is, when the input signal is an audio signal, the signal is encoded from the frequency domain, and thus, the audio decoding unit 410 inversely performs the encoding process to decode the audio signal. In this instance, the audio decoding unit 410 may include a first decoding unit (not illustrated) to decode an LPC residual signal encoded based on a real filterbank, and a second decoding unit (not illustrated) to decode an LPC residual signal encoded based on a complex filterbank.

The voice decoding unit 420 may decode an LPC residual signal encoded from a time domain. That is, when the input signal is a voice signal, the signal is encoded from the time domain, and thus, the voice decoding unit 420 inversely performs the encoding process to decode the voice signal.

The distortion controller 430 may compensate for a distortion between an output signal of the audio decoding unit 410 and an output signal of the voice decoding unit 420. That is, the distortion controller may compensate for discontinuity or distortion occurring when the output signal of the audio decoding unit 410 or the output signal of the voice decoding unit 420 is connected.

Figure 5:
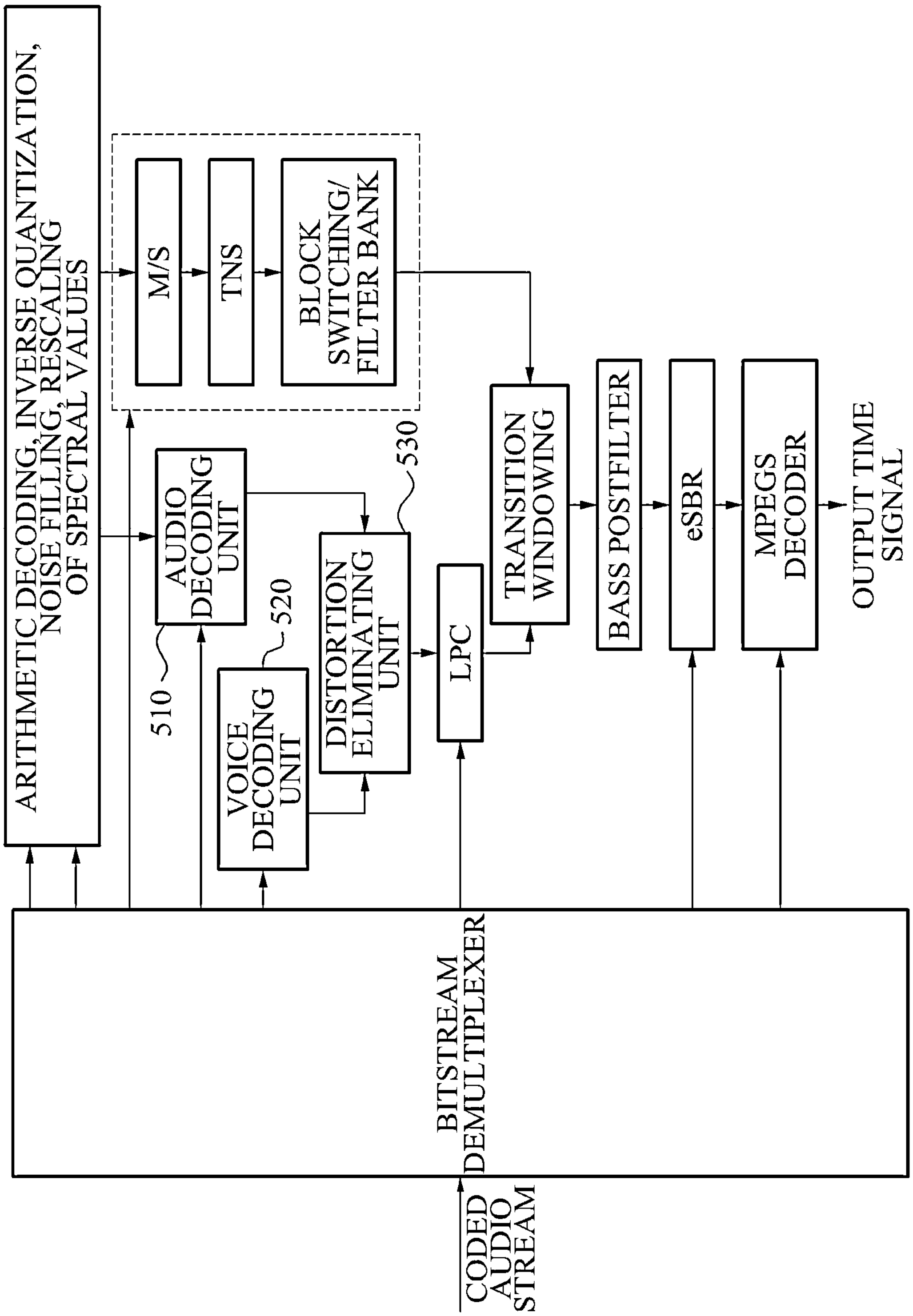
FIG. 5 illustrates an LPC residual signal decoding apparatus in an MDCT based unified voice and audio decoding device according to an example embodiment of the present invention.

FIG. 5 illustrates an LPC residual signal decoding apparatus in an MDCT based unified voice and audio decoding device according to an example embodiment of the present invention.

Referring to FIG. 5, a decoding process is performed inversely to an encoding process, and streams encoded based on different encoding schemes may be decoded based on respectively different decoding schemes. As an example, the audio decoding unit 510 may decode an encoded audio signal, and may decode, as an example, a stream encoded based on a real filterbank and a stream encoded based on the complex filterbank. Also, the voice decoding unit 520 may decode an encoded voice signal, and may decode, as an example, a voice signal encoded from a time domain based on an ACELP. In this instance, the distortion controller 530 may compensate for a discontinuity or a block distortion occurring between two blocks.

Also, in an encoding process, a window applied as a preprocess of a real based (e.g. MDCT based) filterbank and a window applied as a preprocess of a complex based filter bank may be differently defined, and when the MDCT based filterbank is performed, a window may be defined as given in Table 1 below, according to a mode of a previous frame.

TABLE 1

| MDCT based residual filterbank mode of a previous frame | MDCT based residual filterbank mode of a current frame | A number of coefficients transformed to a frequency domain | ZL | L | M | R | ZR |
|---|---|---|---|---|---|---|---|
| 1, 2, 3 | 1 | 256 | 64 | 128 | 128 | 128 | 64 |
| 1, 2, 3 | 2 | 512 | 192 | 128 | 384 | 128 | 192 |
| 1, 2, 3 | 3 | 1024 | 448 | 128 | 896 | 128 | 448 |

As an example, a shape of a window of an MDCT residual filterbank mode 1 will be described with reference to FIG. 6.

Figure 6:
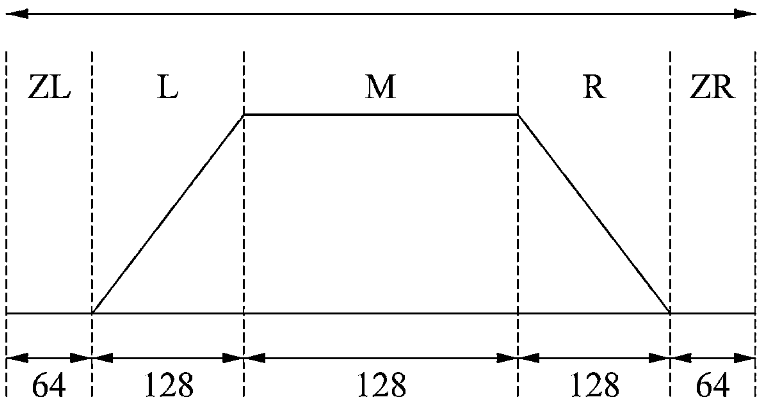
FIG. 6 illustrates a shape of window according to an example embodiment of the present invention.

Referring to FIG. 6, the ZL is a zero block section of a left side of a window, the L is a section that is overlapped with a previous block, the M is a section where a value of "1" is applicable, the R is a section that is overlapped with a next block, and the ZR is a zero block section of a left side of the window. Here, when an MDCT is transformed, an amount of data is reduced to half, and the number of transformed coefficients may be (ZL+L+M+R+ZR)/2. Also, various windows, such as a Sine window, a KBL window, and the like, are applied to the L section and the R section, and the window may have the value of "1" in the M section. Also, a window, such as the Sine window, the KBL window, and the like, may be applied once before transformation from a Time to a Frequency and may be applied once again after transformation from the Frequency to the Time.

Also, when both of the current frame and the previous frame are in a complex filterbank mode, a shape of a window of the current frame may be defined as given in Table 2 below.

TABLE 2

| MDCT based residual filterbank mode of a previous frame | MDCT based residual filterbank mode of a current frame | A number of coefficients transformed to a frequency domain | ZL | L | M | R | ZR |
|---|---|---|---|---|---|---|---|
| 1 | 1 | 288 | 0 | 32 | 224 | 32 | 0 |
| 1 | 2 | 576 | 0 | 32 | 480 | 64 | 0 |
| 2 | 2 | 576 | 0 | 64 | 448 | 64 | 0 |
| 1 | 3 | 1152 | 0 | 32 | 992 | 128 | 0 |
| 2 | 3 | 1152 | 0 | 64 | 960 | 128 | 0 |
| 3 | 3 | 1152 | 0 | 128 | 896 | 128 | 0 |

Table 2 does not include the ZL and ZR, unlike Table 1, and has the same frame size and the same coefficients transformed into the frequency domain. That is, the number of the transformed coefficients is ZL+L+M+R+ZR.

Also, a window shape, when an MDCT based filter bank is applied in the previous frame, and a complex based filter bank is applied in the current frame, will be described as given in Table 3.

TABLE 3

| MDCT based residual filterbank mode of a previous frame | MDCT based residual filterbank mode of a current frame | A number of coefficients transformed to a frequency domain | ZL | L | M | R | ZR |
|---|---|---|---|---|---|---|---|
| 1, 2, 3 | 1 | 288 | 0 | 128 | 128 | 32 | 0 |
| 1, 2, 3 | 2 | 576 | 0 | 128 | 384 | 64 | 0 |
| 1, 2, 3 | 3 | 1152 | 0 | 128 | 896 | 128 | 0 |

Here, an overlap size of a left side of the window, that is a size overlapped with the previous frame, may be set to "128".

Also, a window shape, when the previous frame is in the complex filterbank mode and the current frame is in an MDCT based filterbank mode, will be described as given in Table 4.

TABLE 4

| MDCT based residual filterbank mode of a previous frame | MDCT based residual filterbank mode of a current frame | A number of coefficients transformed to a frequency domain | ZL | L | M | R | ZR |
|---|---|---|---|---|---|---|---|
| 1, 2, 3 | 1 | 256 | 64 | 128 | 128 | 128 | 64 |
| 1, 2, 3 | 2 | 512 | 192 | 128 | 384 | 128 | 192 |
| 1, 2, 3 | 3 | 1024 | 448 | 128 | 896 | 128 | 448 |

Here, the same window of Table 1 may be applicable to Table 4. However, the R section of the window may be transformed to "128" with respect to the complex filterbank mode 1 and 2 of the previous frame. An example of the transformation will be described in detail with reference to FIG. 7.

Figure 7:
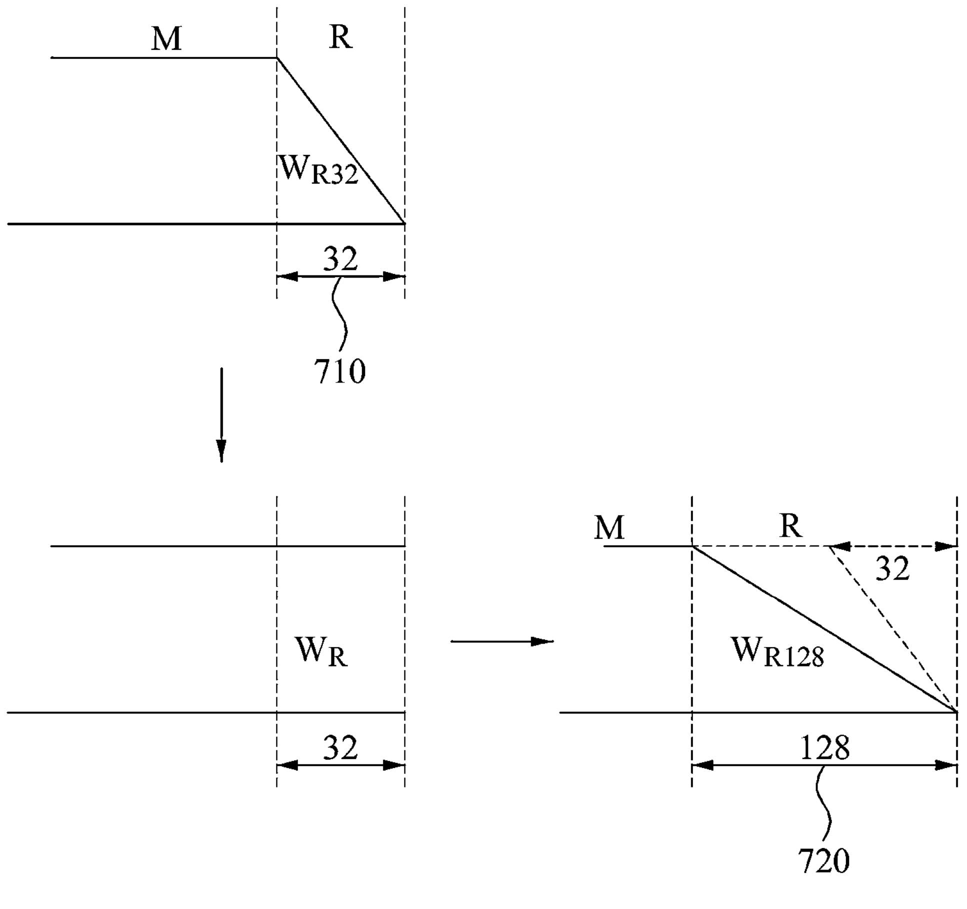
FIG. 7 illustrates a procedure where an R section of a window is changed according to an example embodiment of the present invention.

Referring to FIG. 7, when a complex filter bank mode of a previous frame is "1", first, a window 710 of an R section where WR32 is applied is eliminated. As an example, to eliminate the window 710 of the R section where WR32 is applied, the window 710 of the R section where WR32 is applied may be divided by WR32. After eliminating the window 710 of the R section where WR32 is applied, a window 720 of an WR 128 may be applicable. In this instance, a ZR section does not exist, since it is a complex based residual filterbank frame.

Also, when the previous frame performs encoding by using an ACELP, and a current frame is in an MDCT filterbank mode, the window may be defined as given in Table 5.

TABLE 5

| MDCT based residual filterbank mode of a previous frame | MDCT based residual filterbank mode of a current frame | A number of coefficients transformed to a frequency domain | ZL | L | M | R | ZR |
|---|---|---|---|---|---|---|---|
| 0 | 1 | 320 | 160 | 0 | 256 | 128 | 96 |
| 0 | 2 | 576 | 288 | 0 | 512 | 128 | 224 |
| 0 | 3 | 1152 | 512 | 128 | 1024 | 128 | 512 |

That is, Table 5 defines a window of each mode of the current frame when a last mode of the previous frame is zero. Here, when the last mode of the previous frame is zero and a mode of the current frame is "3", Table 6 may be applicable.

TABLE 6

| MDCT based residual filterbank mode of a previous frame | MDCT based residual filterbank mode of a current frame | A number of coefficients transformed to a frequency domain | ZL | L | M | R | ZR |
|---|---|---|---|---|---|---|---|
| 0 | 3 | 1152 | 512 + α | α | 1024 | 128 | 512 |

Here, α may be 0≤α≤sN/2 or α=sN In this instance, a transform coefficient may be 5×sN. As an example, sN=128 in Table 6.

Accordingly, a frame connection method of when 0≤α≤sN/2 and a frame connection method of when α=sN are different will be described in detail with reference to FIGS. 8 and 9. Here, FIG. 8 describes a method that does not consider an aliasing. Also, a is a section where the aliasing is not generated in a Mode 3 and Mode 3 signal may perform an overlap add with a Mode 0 signal. However, when a value of the a increases and an aliasing is generated, the Mode 0 signal may generate an artificial aliasing signal and may perform an overlap add with the Mode 3. FIG. 9 describes a process of artificially generating the aliasing in the Mode 0, and a process of connecting the Mode 0 that generates the aliasing with the Mode 3 by performing overlap add based on a time domain aliasing cancellation (TDAC) method.

Figure 8:
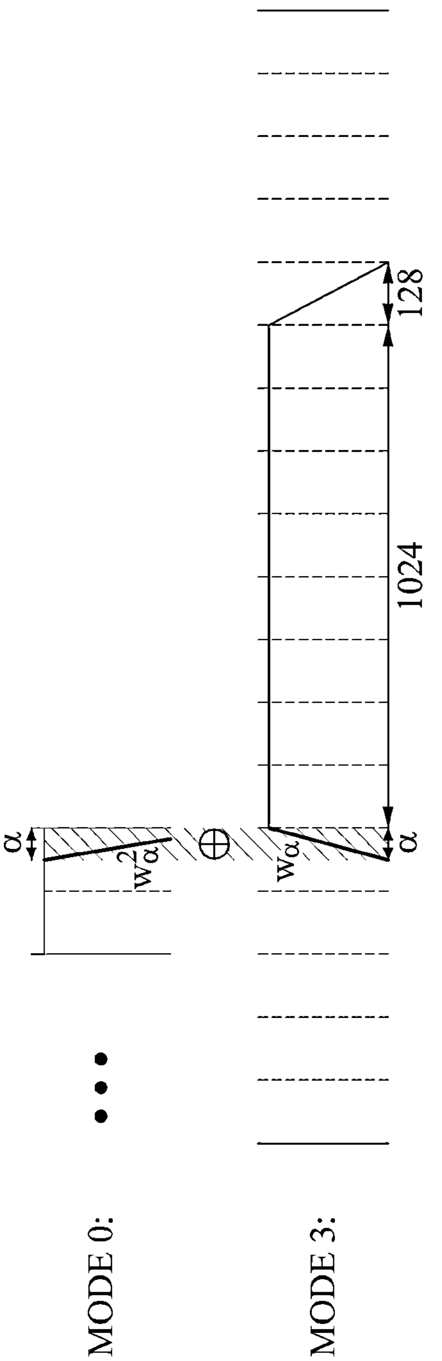
FIG. 8 illustrates a window of when a last mode of a previous frame is zero and a mode of a current frame is 3 according to an example embodiment.
Figure 9:
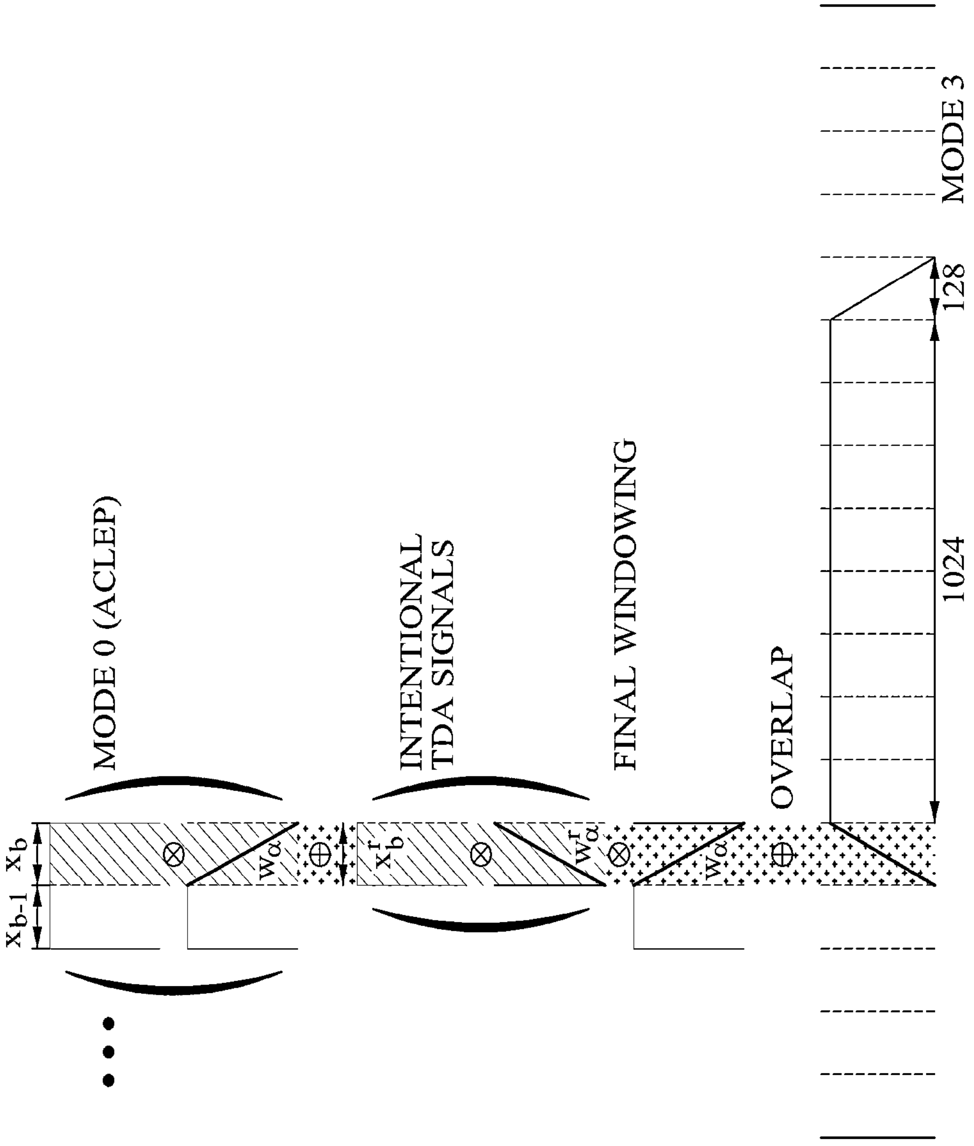
FIG. 9 illustrates a window of when a last mode of a previous frame is zero and a mode of a current frame is 3 according to another example embodiment.

Detailed description with reference to FIGS. 8 and 9 will be provided. First, When 0≤α≤sN/2, a connection method with a previous frame is a general overlap add method, and is illustrated in FIG. 8. Here, $w_\alpha$ is a window of a slope section, and $$w_\alpha^2$$

is applied to an ACELP mode in consideration that a window is applied before/after transformation between Time and Frequency.

When sN=128 the connection is processed as shown in FIG. 9. Referring to FIG. 9, first, a $w_\alpha$ window is applied to an ACELP block, $(w_\alpha \times x_b)$. Here, $x_b$ is a notation with respect to a sub-block of the ACELP block. Next, to add an artificial TDA signal, $$w_\alpha^r$$

is applied to $$x_b^r$$

and added to $$(w_\alpha^r \times x_b^r)$$

and to $(w_\alpha \times x_b)$. Here, r is a reverse sequence. That is, when $x_b$=[x(0), . . . x(ns−1)], $$x_b^r = [x(ns-1), \ldots x(0)]$$

Next, the $w_\alpha$ is applied last and a block to be lastly overlap added is generated. The $w_\alpha$ is applied last once again, since a windowing after the transformation from Frequency to Time is considered. The generated block $$((w_\alpha \times x_b) + (w_\alpha^r \times x_b^r)) \times w_\alpha$$

is overlap added and is connected to an MDCT block of a Mode 3.

As described in the above description, a block, expressing a residual signal as a complex signal and performing encoding/decoding, is embodied to encode/decode an LPC residual signal, and thus, an LPC residual signal encoding/decoding apparatus that improves encoding performance may be provided and an LPC residual signal encoding/decoding apparatus that does not generate an aliasing on a time axis may be provided.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An audio signal processing method performed by a processor, comprising:

identifying a first frame to be coded by a first coding scheme;

identifying a second frame to be coded by a second coding scheme;

identifying additional information for cancelling a first domain corresponding to first coding scheme aliasing introduced by the second coding scheme; and adding (i) a first signal related to the first frame, (ii) a second signal related to the additional information, and (iii) a third signal related to the second frame.

2. The audio signal processing method of claim 1, wherein the first frame has a speech characteristic, and the second frame has an audio characteristic.

3. The audio signal processing method of claim 1, wherein the first coding scheme is a time-domain coding scheme, and the second coding scheme is a frequency-domain coding scheme.

4. The audio signal processing method of claim 1, wherein the time-domain coding scheme includes CELP (code-excited linear prediction), and the frequency-domain coding scheme includes MDCT (Modified Discrete Cosine Transform).

5. The audio signal processing method of claim 3, wherein the first signal is derived from a portion of the first frame, the second signal is derived from the additional information, and third signal is derived from the second frame.

6. The audio signal processing method of claim 1, wherein the additional information is different from the first frame.

7. The audio signal processing method of claim 1, wherein the additional information is used for restoring the second frame.

8. The audio signal processing method of claim 1, wherein the additional information has length corresponding to a portion of an entire length of the second frame.

9. The audio signal processing method of claim 1, wherein the additional information is applied to a boundary between the first frame and the second frame.

10. An audio signal processing method performed by a processor, comprising:

identifying a first frame to be coded by a first coding scheme;

identifying a second frame to be coded by a second coding scheme;

identifying additional information for compensating a first domain corresponding to first coding scheme aliasing introduced by the second coding scheme;

determining a first signal based on a portion of the first frame;

determining a second signal based on the additional information;

determining a third signal based on the second frame; and adding the first signal, the second signal and the third signal to restore the second frame.

11. The audio signal processing method of claim 10, wherein the first frame has a speech characteristic, and the second frame has an audio characteristic.

12. The audio signal processing method of claim 10, wherein the first coding scheme is a time-domain coding scheme, and the second coding scheme is a frequency-domain coding scheme, and wherein the time-domain coding scheme includes CELP (code-excited linear prediction), and the frequency-domain coding scheme includes MDCT (Modified Discrete Cosine Transform).

13. The audio signal processing method of claim 10, wherein the additional information is different from the first frame.

14. The audio signal processing method of claim 10, wherein the additional information has length corresponding to a portion of an entire length of the second frame.

15. The audio signal processing method of claim 10, wherein the additional information is applied to a boundary between the first frame and the second frame.

* * * * *